US010791361B1

(12) United States Patent
Thapaliya

(10) Patent No.: US 10,791,361 B1
(45) Date of Patent: Sep. 29, 2020

(54) SYSTEM AND METHOD FOR IN-VIDEO PRODUCT PLACEMENT AND IN-VIDEO PURCHASING CAPABILITY USING AUGMENTED REALITY

(71) Applicant: AUGMENTED AND SEGMENTED MEDIA INTERFACE CORP., Redwood City, CA (US)

(72) Inventor: Sambhab Thapaliya, Atherton, CA (US)

(73) Assignee: Augmented And Segmented Media Interface Corp., Redwood City, CA (US)

( * ) Notice: Subject to any disclaimer, the term of this patent is extended or adjusted under 35 U.S.C. 154(b) by 0 days.

(21) Appl. No.: 16/893,263

(22) Filed: Jun. 4, 2020

Related U.S. Application Data

(60) Provisional application No. 62/858,267, filed on Jun. 6, 2019.

(51) Int. Cl.
| H04N 21/431 | (2011.01) |
| H04N 21/478 | (2011.01) |
| H04N 21/466 | (2011.01) |
| G06T 19/00 | (2011.01) |

(52) U.S. Cl.
CPC ..... *H04N 21/4316* (2013.01); *H04N 21/4662* (2013.01); *H04N 21/4667* (2013.01); *H04N 21/47815* (2013.01); *G06T 19/006* (2013.01)

(58) Field of Classification Search
CPC ......... H04N 21/4316; H04N 21/47815; H04N 21/4667; H04N 21/4662
See application file for complete search history.

(56) References Cited

U.S. PATENT DOCUMENTS

2019/0037254 A1* 1/2019 Fennelly ................ G06Q 20/12

* cited by examiner

*Primary Examiner* — Yassin Alata
(74) *Attorney, Agent, or Firm* — Perkins Coie LLP; Michael Glenn

(57) ABSTRACT

Techniques are provided by which the digital delivery of a viewer-requested video along with the best chosen advertisement for the viewer is improved. These techniques may be particularly suited for the short video industry. An innovative video analytics mechanism and user-behavioral analytics mechanism are provided, with which the best match of an exact product on the video for the particular viewer is advertised on the video, while the viewer is viewing the video. Further, techniques are provided that enable the viewer to purchase the product while still in the video, not having to leave the video or the site to complete the purchase.

20 Claims, 11 Drawing Sheets

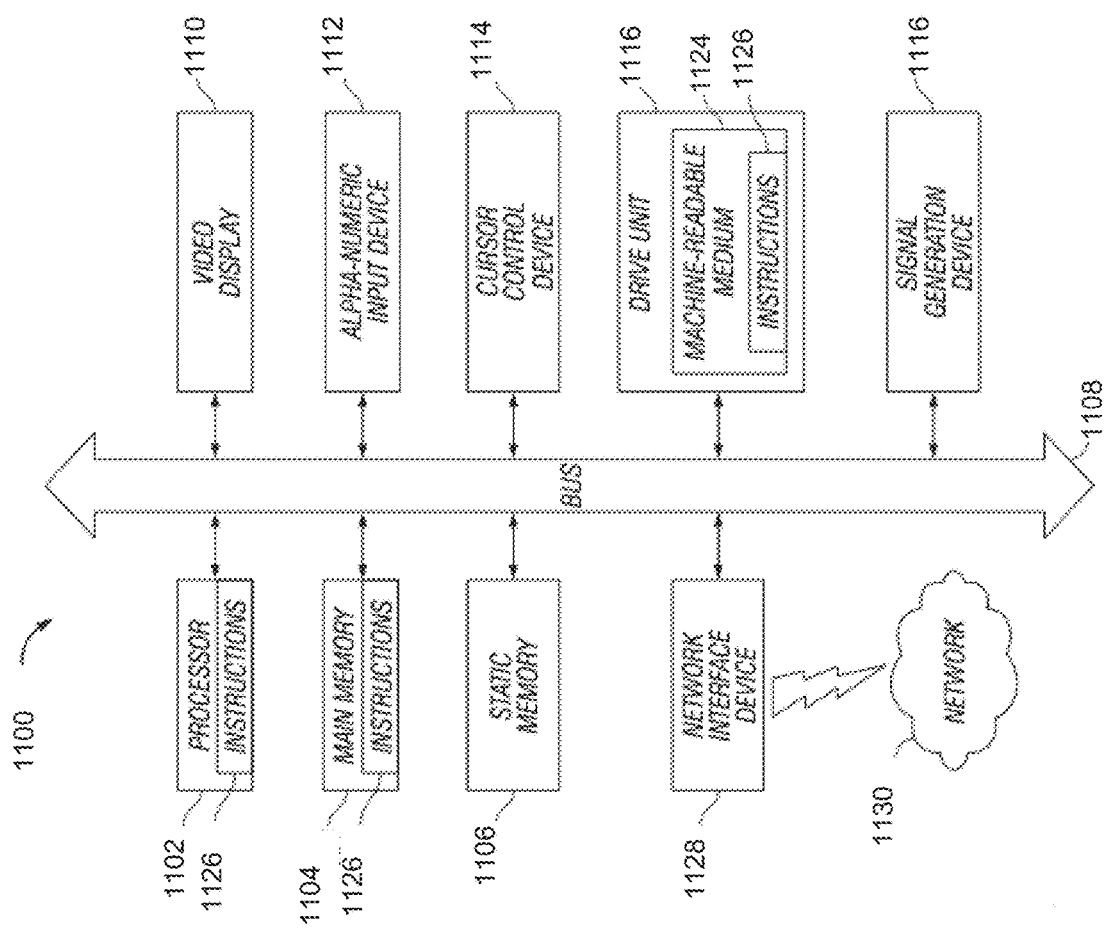

SYSTEM AND METHOD FOR IN-VIDEO PRODUCT PLACEMENT AND IN-VIDEO PURCHASING CAPABILITY USING AUGMENTED REALITY

CROSS REFERENCE TO RELATED APPLICATIONS

This patent application claims priority from U.S. provisional patent application Ser. No. 62/858,267, Product Placement and Marketing using Augmented Reality, filed Jun. 6, 2019, the entirety of which is incorporated herein by this reference thereto.

BACKGROUND OF THE INVENTION

Technical Field

This invention relates generally to the field of object recognition in computer vision technology and augmented reality technologies. More specifically, this invention relates to a system and method for product placement and marketing using object recognition and augmented reality.

Description of the Related Art

Presently, companies provide platforms on which creators may upload their digital videos for viewers to consume. To support their efforts, such companies may allow digital advertisements from third-party vendors to be displayed along with the video. These advertisements might be presented before or after the video is streamed. Worse, the video stream may be interrupted in the middle so that the advertisement is played. In other examples, the advertisement might be played on the screen space with the video, perhaps alongside the video or as a small window overlaying the video.

SUMMARY

Techniques are provided by which the digital delivery of a viewer-requested video along with the best chosen advertisement for the viewer is improved. These techniques may be particularly suited for the short video industry. An innovative video analytics mechanism and user-behavioral analytics mechanism are provided, with which the best match of an exact product on the video for the particular viewer is advertised on the video, while the viewer is viewing the video. Further, techniques are provided that enable the viewer to purchase the product while still in the video, not having to leave the video or the site to complete the purchase.

BRIEF DESCRIPTION OF THE DRAWINGS

One or more embodiments of the present invention are illustrated by way of example and not limitation in the figures of the accompanying drawings, in which like references indicate similar elements.

FIG. 11 is a block schematic diagram of a system in the exemplary form of a computer system according to an embodiment.

DETAILED DESCRIPTION

Figure 1:
FIG. 1 depicts a screenshot of a video frame in which an interactive video object, an interactive product logo, and an interactive product purchase window in a portion of the video are each presented, in accordance with an embodiment.

Techniques are provided by which the digital delivery of a viewer-requested video along with the best chosen advertisement for the viewer is improved. These techniques may be particularly suited for the short video industry. An innovative video analytics mechanism and user-behavioral analytics mechanism are provided, with which the best match of an exact product on the video for the particular viewer is advertised on the video, while the viewer is viewing the video. Further, techniques are provided that enable the viewer to purchase the product while still in the video, not having to leave the video or the site to complete the purchase.

As mentioned above, presently, companies provide platforms on which creators may upload their digital videos for viewers to consume. To support their efforts, such companies may allow digital advertisements from third-party vendors to be displayed along with the video. These advertisements might be presented before or after the video is streamed. Worse, the video stream may be interrupted in the middle so that the advertisement is played. In other examples, the advertisement might be played on the screen space with the video, perhaps alongside the video or as a small window overlaying the video. In all of these configurations, the advertisement selected may not be correlated with one or more of the objects within the video being viewed. In addition, when a viewer desired an object in the video and would like to purchase that object, the viewer is required to perform many additional steps on the Internet, such as executing one or more searches for the item, going to one or more vendors' websites to study the attributes of the product, and opening the webpage to buy the desired item.

All of the present day steps required for a viewer to purchase the exact product as seen in the video takes many actions on the Internet, including opening many webpages. When millions of viewer across the globe are in the process of viewing videos and trying to purchase products as seen within the videos, a lot of processing cost is had, a lot of server chargers are made, and a lot of data is going back and forth, across the Internet. These events directly affect the performance of the all users of the video sites, the vendors, the creators, and the performance of the Internet in general. The Internet slows down. The website slows down. There is the problem of load management for Content Delivery Networks (CDN).

The innovation described herein solves the problem by improving the processing time for e-commerce technology, timewise and processing cost-wise. In addition, techniques described improve digital user-consumption technology and improve user-convenience. Now, instead of the viewer imposing many costs on the Internet channel, as described above, the viewer can check out and purchase a product within the video, itself.

The innovation is a system, method, and platform ("system," "process," or "platform") that recognizes the objects from a video, places automatically an augmented reality-based (AR) advertisement (ad), and enables the viewer to purchase the product in the advertisement from the video, while still viewing the video. As shown in the picture, e.g. video frame, in FIG. 1, the innovation detects all the objects in the video and automatically places the AR advertisement. For example, the innovation detects the guitar 102 and automatically places the vendor's brand indicator, e.g., logo 104, and the guitar's product information, such that the viewer can purchase the same guitar while viewing the video. The innovation involves the features of detection, segmentation of the viewers, and placing the AR advertisement.

The innovation parses the video into frames and detects the objects in the frames of the video. Then the system automatically detects each pixel in the frame and tags those pixels with one of the detected objects. For example, there is a lot of data about what is going on with the video file. In one second there may be seven tress, four birds; in this part of the frame, two seconds, there is this-this-this; three seconds, there is this-this-this, etc. In a one hour video, based on every single second, there is a whole database of the objects and in which coordinate the objects are within the file. Artificial intelligence techniques are used to explain what is going on in predetermined portions of the video, such as in each corner. The AI may indicate that in the left side there is a cup, on the right side there is a white plate, in the other corner there is a white cup, and this-is-this. AI is explaining what is happening in each frame and writing the information down in a file such as a JSON formatted file. This file may be looked back, at any time there is a request. That is, this process a one-time analytics, in which the AI completely explains everything. Also, the AI It explains what is the name of the brand that is present in the video, for example, by accessing a dictionary of products stored in the Ad library.

Thus, when the video is played to the viewer, the viewer may tap each object (which has been tagged in each pixel) and then see an appropriate, corresponding, or matching augmented reality-based advertisement. For example, in FIG. 1 the system automatically had detected the whole guitar so that when someone taps any part of the whole guitar, then AR-based advertisement about the guitar comes up.

Figure 2:
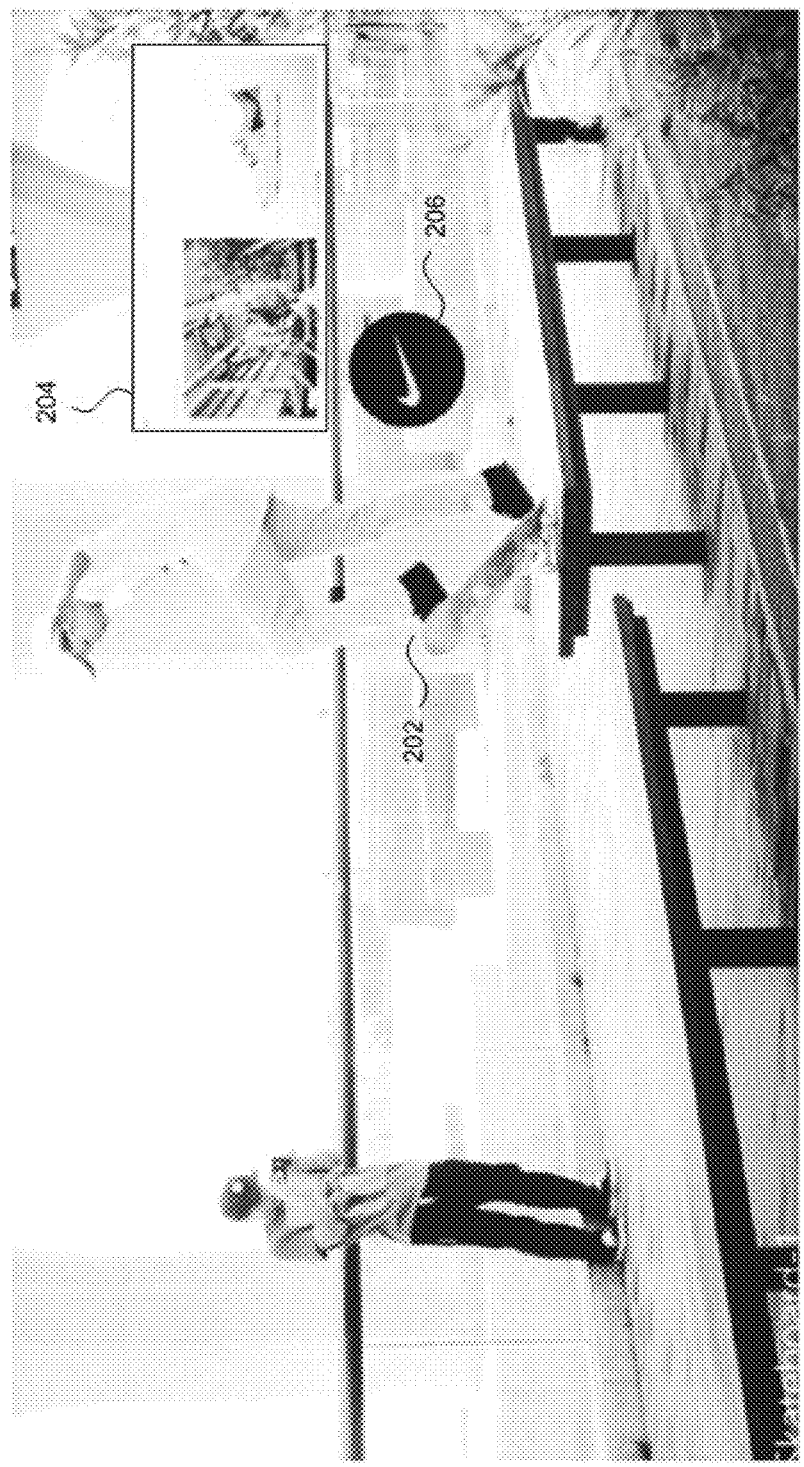
FIG. 2 depicts a screenshot of a video frame in which an interactive video object, an interactive product logo, and an interactive product purchase window in a portion of the video are each presented, in accordance with an embodiment.

Another embodiment is illustrated in FIG. 2. In FIG. 2, the system had previously detected and tagged the shoes 202 and, upon user clicking or moving the mouse over the shoes, automatically displayed in real-time the AR advertisement 204 with the vendor's logo 206 to the viewer.

Figure 3:
FIG. 3 depicts a screenshot of a video frame in which an interactive video object, an interactive product logo, and an interactive product purchase window in a portion of the video are each presented, in accordance with an embodiment.

In one embodiment, as the viewer watches videos, the system continually monitors and analyzes the viewer's linking to sites and, based on that information, creates a list of objects that the system determines the viewer wants to see as advertisement. More specifically, the process proceeds as follows. In video 1: there are 10 objects; in video 2 there are 5 objects; in video 3 there are 2 objects; and in video 4 there is the 1 object with augmented reality-based advertisement. According to the process, in video 1 the system recognized the 10 objects and matches the viewer's demographics and interests with the objects, performs statistical analysis and, subsequently, places a video with 5 objects that falls within the viewer's demographics and interests, based on the first video and his previous history. The process repeats until the system detects the one object that the system determined the viewer is looking to buy and an appropriate advertisement is placed. That is, the system repeats the process until the system finds the object that has the highest probability of the viewer liking it and an advertisement is placed or overlaid. For example, in FIG. 3, the system had recognized the identity of the artist 302 and placed the augmented reality-based animation 304 and a logo 306 about his music.

Figure 4:
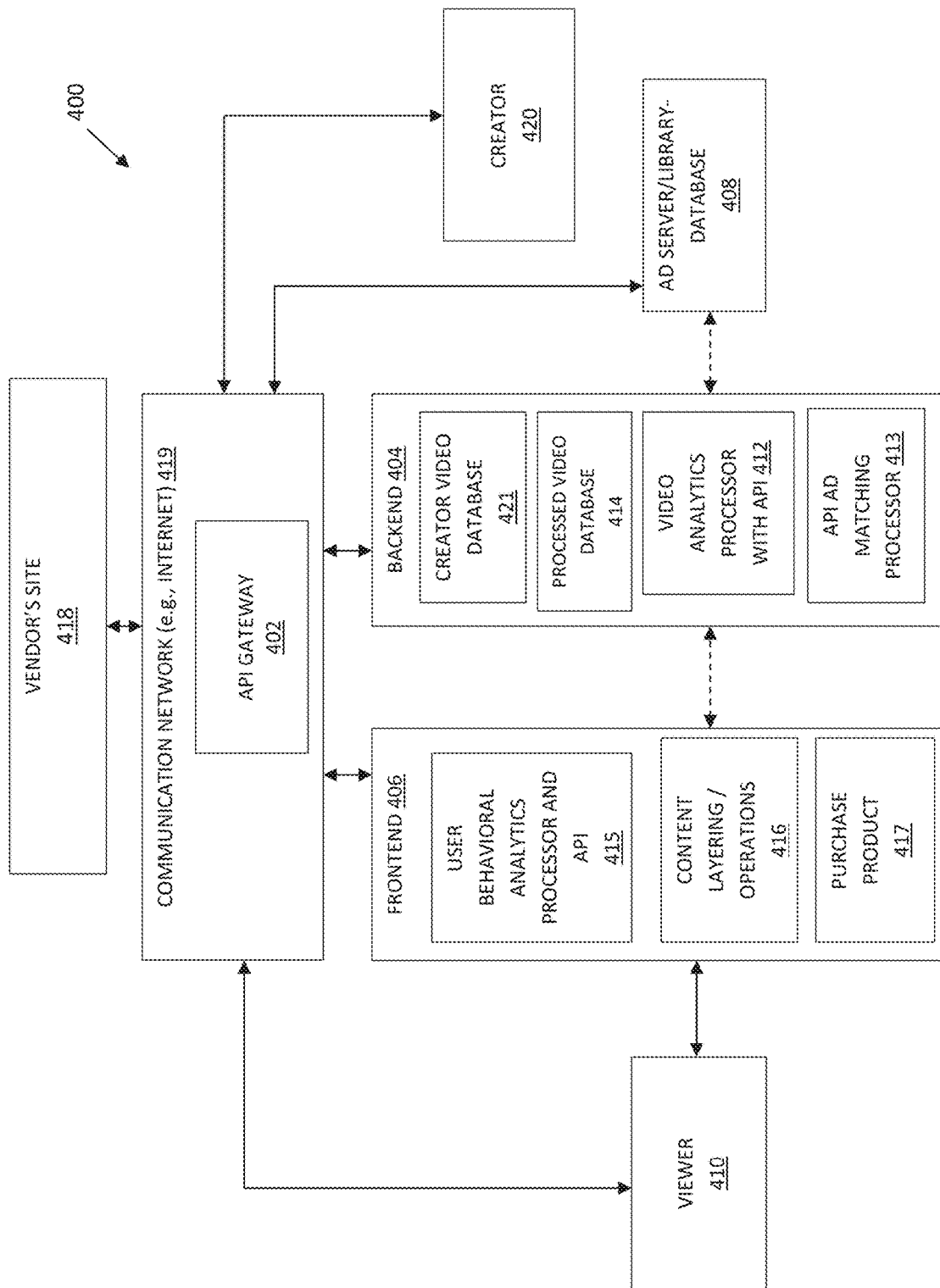
FIG. 4 is a schematic diagram of a high-level architecture of the network environment, in accordance with an embodiment.

An embodiment may be understood with reference to FIG. 4, a schematic diagram of a high-level architecture of the network environment 400. A creator uploads a video to a site so that the video may be watched later by others. For example, creator 420 uploads their video to the database 421 of an enterprise or a social network site, such as for example, Tiktok, YouTube, or Facebook.

Once the video is uploaded, the video is analyzed. For example, in response to the video file being uploaded to creator video database 421, the video analytics component 412 processes the video. In an embodiment, the video analytics component 412 may include a processor and one or more application programming interfaces (API) for processing data in accordance with one or more proscribed algorithms. In an embodiment, video analytics component 412 analyzes the video in four parts:

analyzes basic or standard video information;
analyzes to recognize and identify objects within the video;
determines or establishes the class of the object, according to a predetermined classification system of definitions; and
identifies the exact product that is each object, e.g. by referencing a preloaded Ad server or Ad library.

After completing the analysis process described above, the video analytics component 412 logs the video file to a logfile or register file. Also, the video analytics component 412 records the data resulting from the analysis to a JSON formatted file and stores the JSON file in the processed video database 414 for future retrieval.

An embodiment may be understood with reference to Table A, pseudocode of an exemplary video analytics algorithm, consistent with embodiments herein.

Table A

Analytics:
from app.database.models import UploadedVideo,VideoAnalyticsFile,GeneratedVideo
from datetime import datetime from app.utils.dataUtilsCode import getDetectedObjectsforDatabase,uniqueClassSetAndict,uniqueDictonairies, larrangeNnumberOfDictionary,returnList,writeListAsAJsonFile
from app.darkflowMerge.openCVTFNet import extractFrameInfosFromVideo,extractIndicesFromTuple,frameToVid
from flask_login import current_user, login_required In accordance with the exemplary video analytics algorithm, the process imports the uploaded video, a video analytics file, and the generated video. These files may be filled with information or they may not be filled with information. These files and their data are stored in the database 414. It should be appreciated that the videos are stored in database 414. The process extracts the exact data and time of the import, referred to as import datetime. Then, the process imports the detected objects from the database, the unique class set and dictionary of the objects. For example, the detected objects may be pants, a shirt, and shoes, in the video. Then, the unique class set is imported. For example, the shirt is for a woman, the pants are for a young man, and the shoes are for a young man. Then, the unique dictionary is imported. For example, the exact product for each object. The shoes are Nike, Product No. 12345. The exact product was determined by performing a match operation in the Ad server or library (e.g., Ad Server 408), in which vendors has previously provided their product information. Then, the informational data is written to a record or file (e.g., a JSON file) for future retrieval. Also, the process finds information from each frame of the video, extract frame to frame information from video. The process also extracts the indices from the tuple. For purposes of the discussion herein, tuple means when the video has been divided into thousands of different frames, every frame is assigned a number (1, 2, etc.). At the end of the process, the system obtains the basic user information and login number.

Thus, for example, if creator 420 loads a video in which a person is wearing a woman's white Nike cap, then the process is configured to know on which frames the cap appears and the exact brand and product number of that cap.

In an embodiment, the vendor 418 transmits product description data (e.g., product number, color, size, etc.) for potential viewer purchase in Ad server-database 408. This process may be ongoing. When a vendor is ready to sell its products, the vendor may provide the required information to Ad server 408. In an embodiment, the vendor is enabled to provide the advertisement data by transmitting the data from vendor's site 418 to Ad server-database 408 via communication network 419. In another embodiment, vendor's site 418 is communicably connected to Ad server 408 directly.

In accordance with embodiments herein, the view requests to view a video. For example, viewer 410 makes a request to the frontend 408 component to view a video. For instance, the viewer may want to watch a specific video on Tiktok.

The frontend 406 receives the request and performs the following operations:
- obtains user-behavior analytics (that is continuously being performed) about the user from the user-behavior analytics component 415; and
- forwards the video request information along with the user-behavior analytics data to the backend 404/API Ad Matching Component 413.

An embodiment may be understood with reference to Table B, pseudocode of an exemplary user-behavior analytics algorithm, consistent with embodiments herein.

Table B

Rating-ranking-page optimization-content aware recommendations: What is best for going on the video?
Recommendations Using a User Vector: What is best for based on user User vecor?
Content-based and collaborative behaviours of users and recommendation systems.: What is best for based on other user data?
Collaborative Denoising Auto-Encodersfor Top-N Recommender Systems: What is best for based on data that not needed?
This is what maths process used
Regression models(logistic,linear,elastic nets):
Tree-based methods(gradient-boosted, Random Forests)
Matrix Factorizations
Factorizations machines
Restricted Boltzmann machines
Markov chains and other graphical models
Clustering (from k means to HDP)
Deep learning, neural nets
Linear discriminant analysis
Association Rules
Features:
titles watched or abandoned in a past
members with similar tests/user data
titles with similar attributes
propensity to rewatch
preference for what the user is watching
ratings
time of day day of viewing session
voracity of consumptions
use of list searches In response to the request, video analytics processor 412 sends video information, such as objects recognized in the video, to the API Ad Matching 413. API Ad Matching 413 takes these two inputs, the input from the user-behavioral analytics component and the input from the video analytics component, compares the data from each input together, and determines matching objects and assigns their respective scores. The backend may indicate that there are 10 objects (shirt, pants, hat, etc.) and the frontend may indicate that there are two objects (shirt and shoes) that that person is interested in. For example, API Ad Matching 413 may determine that the shirt gets a score of 8 points (for example, because there is a match of a shirt object from the video analytics input and a shirt from the user-behavioral analytics input) and the shoes gets a score of 1 point (e.g., the API Ad Matching component 413 may be instructed to provide a back-up or default-type object, or the shoes might get a score of 1 dependent on other factors such as past input objects). Alternatively, the API Ad Matching component 413 may determine that just the Shirt Ad and not that Pant Ad are requested (e.g., the API Ad Matching component 413 may be instructed to submit only one object, e.g., the object with the highest score, and attributes to the Ad Server 408). Then, API Ad Matching 413 sends the score of best object with attributes to the Ad Server 408 for obtaining the product informational data (that was previously provided by the vendor and stored therein). For instance, API Ad Matching 413 sends the shirt attributes and the corresponding score of 8 points to the Ad Server 408 for obtaining the exact product advertisement-related informational data for that shirt (e.g., Nike shirt, size=men's small, color=green, product #45678.

In an embodiment, Ad Server 408 receives the score and attributes and finds/determines the corresponding (e.g., best) ad for that video and sends the Ad file corresponding to the product back to the backend 404/API Ad Matching 412 component. In an embodiment, the Ad Server 408 had been prepopulated, by the vendors, with product-related data by appropriate storage capabilities, such as dictionaries, look-up tables, database and related support, and the like. In an embodiment, whenever the vendor wants to offer its product, the vendor loads the product-related data to the Ad Server component 408. This process of the vendor uploading products for selling or promoting may occur on a continual basis by the same vendor or other vendors.

The API Ad Matching component 412 receives the best Ad file and performs a double-checking operation for accuracy. For instance, it checks whether the attributes of the object in the received Ad file matches those of the products (e.g., is the product received a green, women's shirt?).

In an embodiment, the backend component 404 delivers the requested video file from processed video database with the best Ad file from the API Ad Matching 412 to the frontend component 406.

In an embodiment, the content layering component 416 receives the Ad file and the video and layers the content of the Ad over the requested video to create a video plus Ad package. It should be appreciated that such content layering process may occur in real-time, while the viewer is already watching the video. Or, the content layering process may occur before the viewer begins to watch the video, when the video is presented to the viewer. For instance, the ad content may have been layered on specific frames and are not presented until the viewer's streaming process arrives at those frames.

Also, in an embodiment, the advertisement content may be layered, superimposed on, or injected into the video according to one or more of the following processes:
content layering;
content injection;
content repurposing;
content re-forging;
GAN-enabled with content editing; and
content editing.

It should be appreciated that the term, content layering, may be used herein to mean any of the specific processes outlined above and may not be meant to be limiting.

Further, it should be appreciated that the term, content-layer, used herein may mean in-video product placement. Examples of such in-video product placement are illustrated in FIGS. 1 (104 and 106); FIG. 2 (204, 206), and FIGS. 3 (304 and 306).

In an embodiment, the frontend 406 delivers the video plus Ad package to the viewer 410 for viewing.

At some point, the viewer decides to purchase the product within the video. In an embodiment, the viewer 410 interacts with video to purchase presented product, by:
clicking or otherwise selecting that Ad to buy the product within the video by selecting overlaid product-detail window and entering required viewer informational data (e.g., address, payment information (e.g., credit card number), and attributes of the product). For example, the product placement GUI (e.g., 106) may be editable, in which the viewer may insert the required purchase information. In another implementation, the product placement GUI (e.g., 204) may have an embedded link such that when the viewer clicks on the GUI (e.g., 204), another GUI (e.g., dialog window) may pop-up into which the viewer may insert the purchase information discussed above.

In response to receiving the viewer's input information, the purchase product 417 component may perform the following operations:
One) Redirect the viewer to the link that was provided by the vendor in the originally provided information to the Ad server 408. The link may take the viewer to an Ad for the product, from which the viewer may continue to purchase the product. Alternatively, the link may take the view to the vendor's site 418 from which the viewer may continue to purchase the product.
Two) Allow the viewer to purchase the product within the video, itself. The frontend 406/purchase product 417 component takes the three pieces of viewer informational data described above and sends such information to the vendor's site 418 to complete the purchase.

In an embodiment, communication network 419 is illustrated as a generic communication system. In one embodiment, the communication network 419 comprises the Internet. In one embodiment, the communication network 419 comprises the API Gateway 402, a logical hub for the APIs of the frontend 406, the backend 404, and the Ad Server 408 to connect and communicate. In an embodiment, the API Gateway 402 monitors and organizes API requests from the interested parties. As well, the API Gateway 402 may perform other auxiliary operations, such as authentication, rate limiting, and so on. Accordingly, interfaces may be a modem or other type of Internet communication device. Alternatively, the communication network 419 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. In such embodiments, interfaces are configured to establish a communication link or the like with the communication network 419 on an as-needed basis, and are configured to communicate over the particular type of communication network 419 to which it is coupled.

In an embodiment, the frontend 406 is a viewer or end-user facing component such as those provided by enterprises. Examples of enterprises hosting the frontend 406 components may include social networking sites (e.g., Facebook, Instagram, etc.) or dedicated short video viewing sites (e.g., Tiktok). In an embodiment, the viewer device, which may be represented as viewer 410, may be directly connected with the frontend component 406 as an in-app connection.

Figure 5:
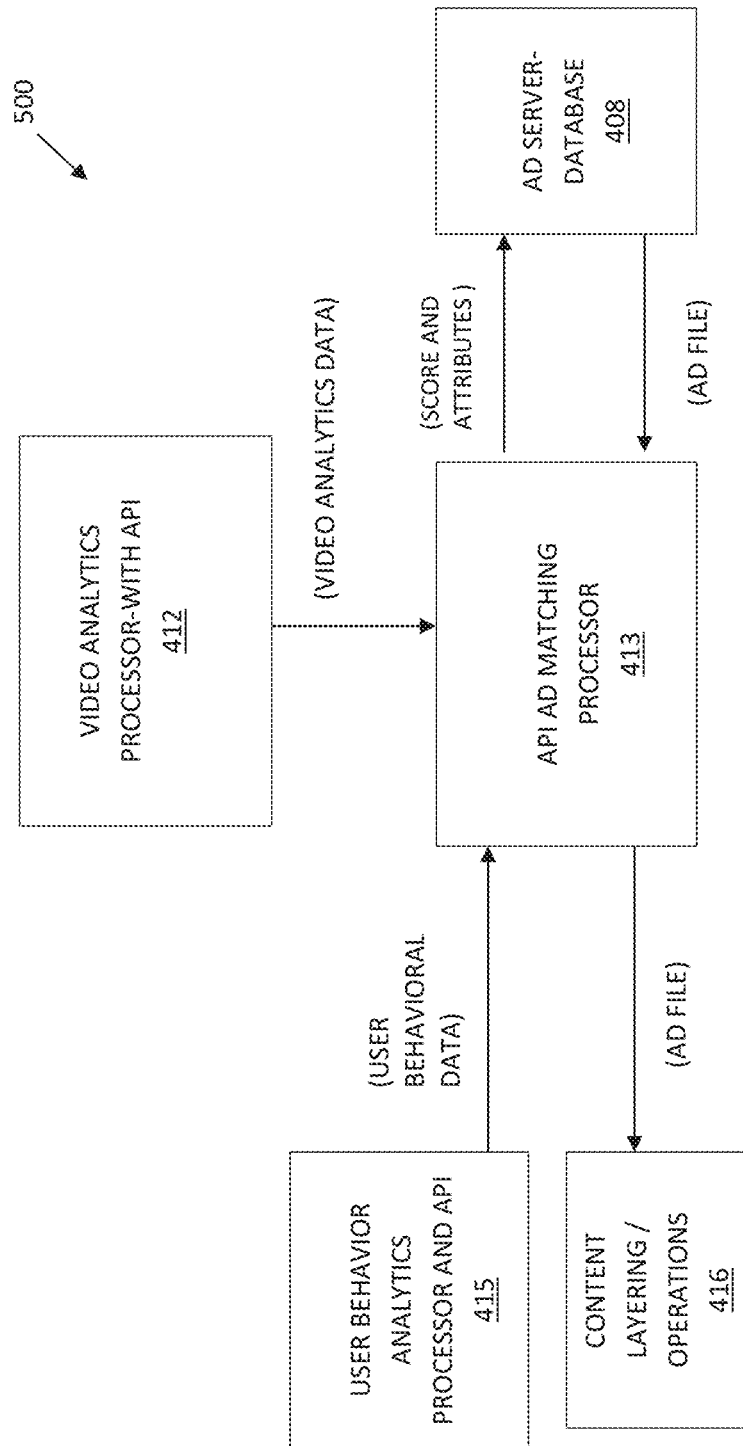
FIG. 5 is a schematic diagram of the API Ad matching process and best Ad file delivery process, in accordance with an embodiment.

An embodiment of the API Ad Matching processing can be understood with reference to FIG. 5, a schematic diagram of the API Ad matching process and best Ad file delivery process 500. The video analytics processor with API (e.g., 412 of FIG. 4) sends video analytics data to the API Ad Matching processor (e.g., 413 of FIG. 4). Similarly, the user-behavior analytics processor and API component (e.g., 415 of FIG. 4) sends user-behavioral data of the viewer also to API Ad Matching processor (e.g., 413 of FIG. 4). The API Ad Matching processor (e.g., 413 of FIG. 4) compares the data from the two inputs to generate objects deemed to be common to both inputs and their respective scores, as described above. Then, the API Ad Matching processor (e.g., 413 of FIG. 4) sends the score(s) and corresponding object attributes to the Ad database or library (e.g., 408 of FIG. 4) to obtain a product match for each object. In another embodiment, the API Ad Matching processor (e.g., 413 of FIG. 4) may send only the highest score and corresponding attributes to the Ad database or library (e.g., 408 of FIG. 4)

to obtain a matching product. In an embodiment, when there is not a match within a predetermined tolerance measurement, no product may be returned. Similarly, a product that is the best fit match may be returned.

In an embodiment, the Ad database or library (e.g., 408 of FIG. 4) sends the Ad file to the API Ad Matching processor (e.g., 413 of FIG. 4). Such processor may verify that the item in the Ad file is correct, within a predetermined tolerance. Subsequently, the Ad file is sent to the frontend component 406. In an embodiment, the Ad file is sent back to the user-behavior analytics processor and API component (e.g., 415 of FIG. 4), which then sends it to the appropriate processing component within the frontend 406. Alternatively, the Ad file is sent back to the content layering/operations component (e.g., 416 of FIG. 4) for being layered or otherwise ingested into the video.

Figure 6:
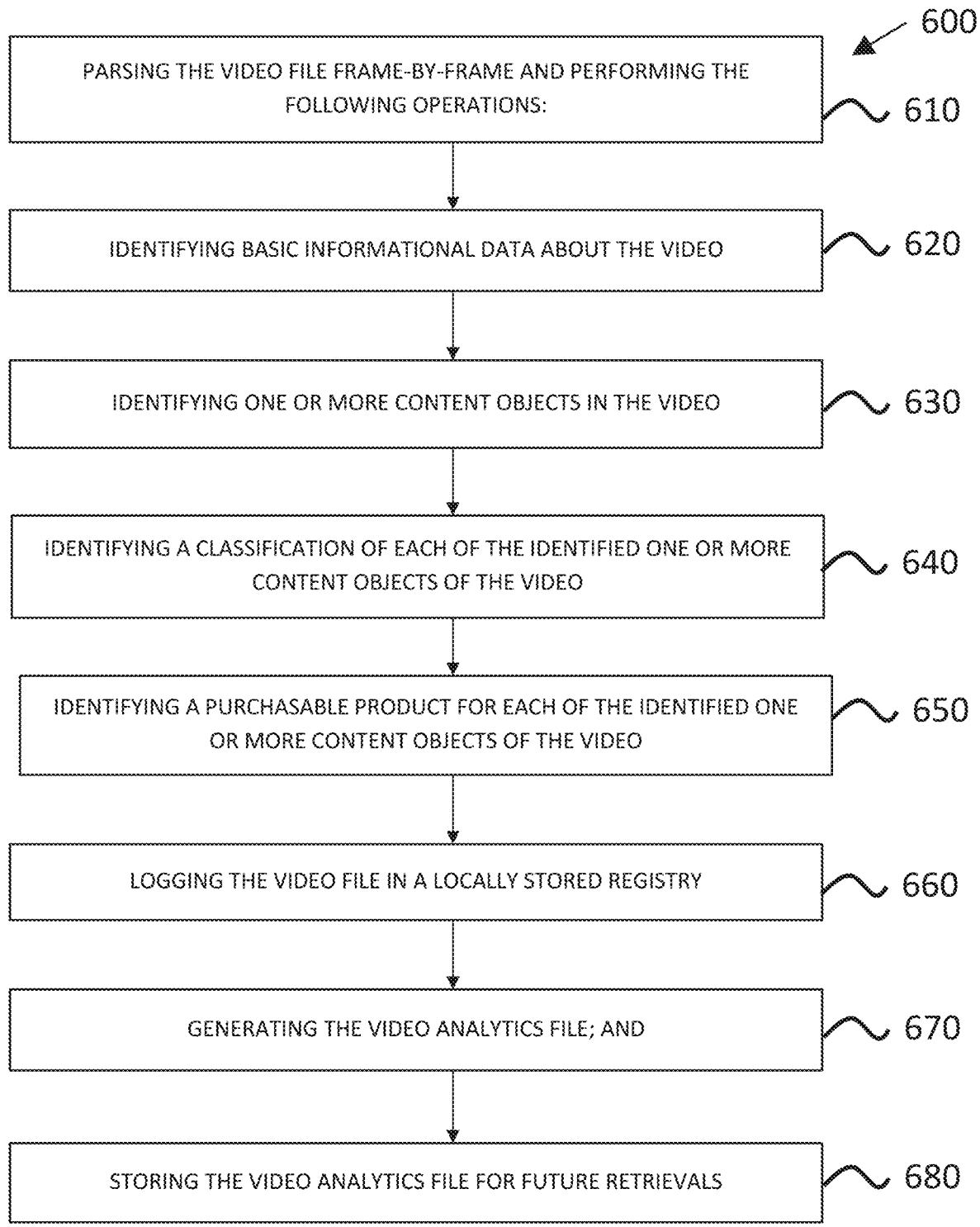
FIG. 6 depicts a process for analyzing and storing video data, including identifying objects within the video and identifying products within the video, in accordance with an embodiment.

An embodiment of a video analytics process can be understood with reference to FIG. 6, a flow diagram for analyzing and storing video data, including identifying objects within the video and identifying products within the video. It should be appreciated that this process may be performed by the video analytics component executed by a processor 412. At step 610, the process includes parsing the video file frame-by-frame and performing the following operations. At step 620, the process identifies basic informational data about the video, such as the title and length. At step 630, the process identifies one or more content objects in the video, such as for example, shirts, guitar, shoes, and skateboard. At step 640, the process identifies a classification of each of the identified one or more content objects of the video. For example, the shirt may be classified as a men's shirt. The skateboard may be classified as a young person's toy. At step 650, the process identifies a purchasable product for each of the identified one or more content objects of the video. For example, video analytics component 412 may access or obtain from Ad server-database 408 exact product data that corresponds to the objects in the video. For example, video analytics component 412 may obtain from Ad server-database 408 that the type of shirt is a men's Nike sportswear shirt in the color green, with product number 23456. At step 660, the process logs the video file in a locally stored registry so that the system knows that it is there and can access the video file information at a subsequent time. For example, the log entry may include the title of the video, the identification number of the video, and other attributes such as size of video and when it was obtained. At step 670, the process generates the video analytics file in which the information necessary for a viewer to request the video and have the best Ad displayed thereon is stored within the video analytics file. In an embodiment, such file is a JSON formatter file. At step 680, the process stores the video analytics file for future retrievals. That is, each time a viewer requests to view the video, the full analytics of the video is present in the file. The Ad that is displayed to the viewer is dependent on the input data from the user-behavioral analytics component (e.g., user-behavioral analytics processor and API 415). In one embodiment, the video and the Ad information are delivered to the viewer and it is the input from the user-behavioral analytics component that determines which Ad is presented. Alternatively, the video and the best Ad is delivered to the viewer.

Figure 7:
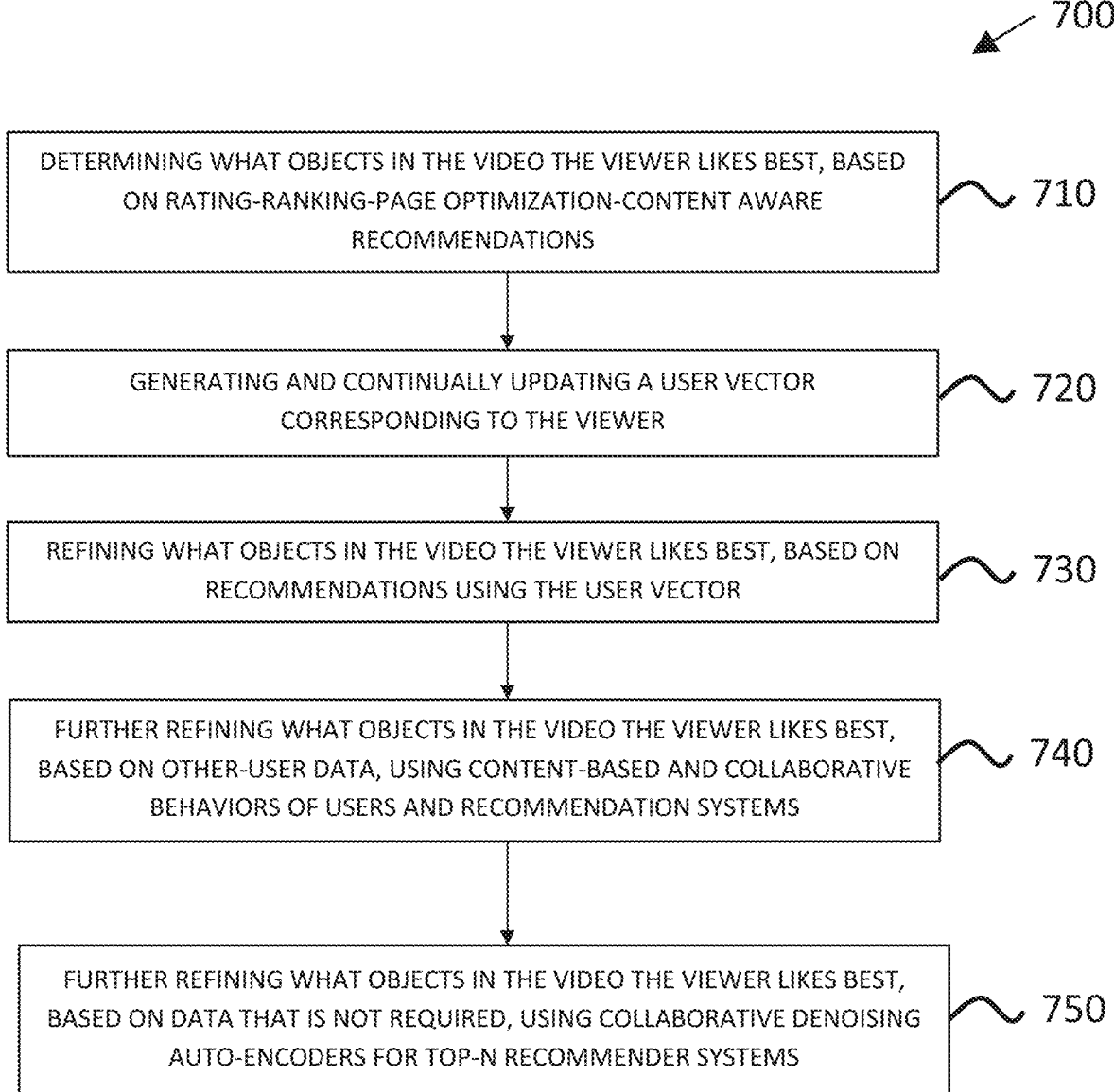
FIG. 7 depicts a process for analyzing user-behavioral data, including identifying objects viewed on videos, in accordance with an embodiment.

An embodiment of a user-behavioral analytics process with API can be understood with reference to FIG. 7, a flow diagram for analyzing user-behavioral data 700, including identifying objects viewed on videos. An exemplary user-behavioral analytics process with API may be 415 of FIG. 4. At step 710, the process determines what objects in the video the viewer likes best, based on rating-ranking-page optimization-content aware recommendations. For example, the process may determine that the viewer has a young adult son who has a birthday approaching and that the viewer has been determined to like sports clothing of young men. At step 720, the process generates and continually updates a user vector corresponding to the viewer. For example, the user vector may contain information identifying the viewer as being a late middle-aged woman of short stature, having a post-graduate degree, and having appears in a specific range of household income. At step 730, the process refines what objects in the video the viewer likes best, based on recommendations using the user vector. For example, the video may contain an object with a designer shirt for men. The process may determine that the viewer may like this item. At step 740, the process further refines objects in the video the viewer likes best, based on other-user data, using content-based and collaborative behaviors of users and recommendation systems. For example, the process may discover that the viewer has friends on social networking applications who like traveling to resorts. Thus, the process may determine that among the already selected objects, the viewer likes the objects which can be used in hot weather and for a vacation at a resort-type location. For instance, the process may identify a young man's trending Nike cap as being of high interest and a tasteful pair of sunglasses to the viewer. At step 750, the process further refines the objects in the video the viewer likes best, based on data that is not required, using collaborative denoising auto-encoders for top-n recommender systems. For example, the process may eliminate as irrelevant data that indicated that the viewer was viewing links and videos on baby items for one day only, as opposed to numerous days looking at vacation-related videos and links.

In an embodiment, the platform includes one API set in the backend server 404 and one API set in the frontend server 406. Such APIs connect three things. One is the backend database, where the videos are stored (e.g., database 414), the frontend viewing experience (frontend 406 accessible to viewer 410), where the end-user is going to view the video, and the ad servers (e.g., ad server-database 408).

An Exemplary Process

An exemplary process is described as follows, in accordance with embodiments herein. In the backend (e.g., 404), the backend API (e.g., video analytics processor with API 412) has already analyzed every single video file that is stored in there (e.g., in database 414). While it analyzes the video, the API does a few things, including looking at every single frame, analyzing what is going on there, and keeping a log file of the information. Meanwhile, the frontend (e.g., user-behavioral analytics processor and API 415) is constantly segmenting the viewer. Such segmentation is done based on how the viewer is viewing the content, what is in the content, and how the viewer reacted to the specific content. The frontend 406 is constantly reacting to and/or trying to figure out what the viewer or end-user is interested in.

Then, on the viewer side, suppose the viewer is watching a video of someone dancing. In that video, in the backend, the viewer has requested a video file. The backend server had sent the video file to the viewer. In the backend, there is one API (the backend API) that knew that now the viewer is ready to be served an ad. Thus, the backend API, is prepared to communicate with the frontend indicating, show this small file to this user. However, at the same time while on the way, the backend picks up a small ad from the Ad Library and brings it with the video for delivery to the frontend.

Thus, referring to FIG. 1, as with the viewer watching the person playing guitar with an Amazon popup and the logo, there is the backend server where such video file is stored, and there is an API that has all the analytics, as discussed above. In an embodiment, in the frontend, while the viewer is watching the video, the backend API knows that the viewer is ready to see an Ad. The frontend requests, e.g., by sending objects to the backend, that the viewer see even more interesting guitar-related ads. The backend (e.g., the API Ad Matching Processor 413) accesses the Ad Server 408 and gets a Guitar Ad from the Ad Library 408. The frontend API picks up that Guitar Ad and layers that Ad in front of the viewer in real-time or as a different video is being delivered.

Figure 8:
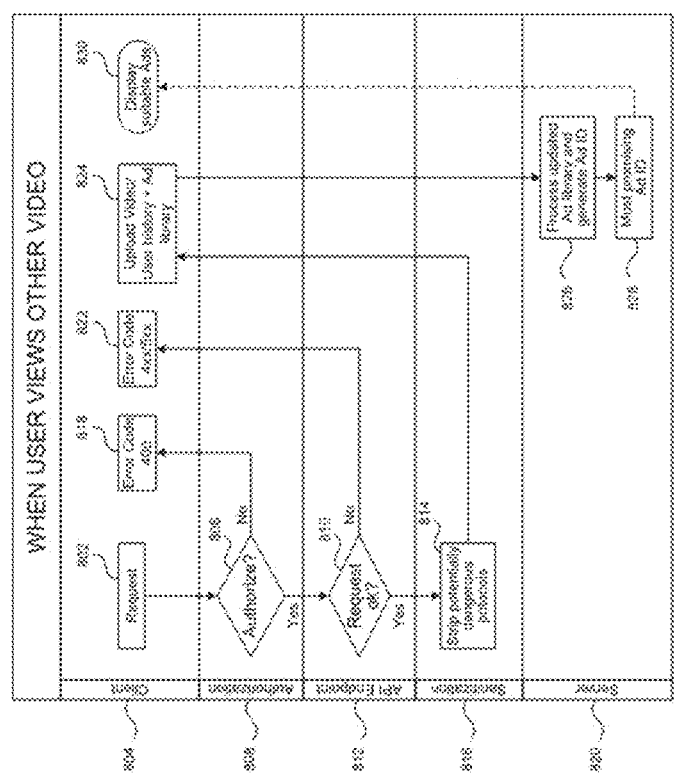
FIG. 8 depicts a network environment for when a viewer views the video, in accordance with an embodiment.

An embodiment can be understood with reference to FIG. 8, a network environment for when a viewer views the video (e.g., the creator's video). The server (e.g., frontend 406) receives a request 802 for a video from the client device 804. In response to the receipt, an authorization processor 808 determines whether the client is authorized to obtain or view the video. For example, the server checks whether it a private video or a public video. If it is a public video, then the server checks whether this client has access ability. If so, the process continues along the "yes" path. If not, an error code 818 is returned to or displayed for the client 804. If yes, control goes to an API Endpoint processor 812. Such API Endpoint processor 812 checks whether the request, itself, is acceptable 810. If no, then the appropriate error handling 822 is performed. If yes, the control goes to a sanitization processor 816. Such processor strips the request of potentially dangerous protocols at step 814. After doing so, at step 824, the video is uploaded at the client, along with user history being updated and the appropriate Ads from the Ad library being sent with the video. At step 826, the process is updated and goes to the backend server 820, to the Ad library to generate an Ad ID. At step 828, the server 820 updates the Ad library or provides user history and generates the most promising Ad(s) ID(s). The most promising Ad(s) ID(s) are used to obtain the most promising Ads. Such most promising Ads are transmitted by the server 820 to the client 804 for display 830. For example, a video has a lot of personal information in terms of the labels. The labels are stripped and only the video files are sent to the client. Thus, for example, each time a creator uploads a video in a company's (e.g., TikTok) video site, the site records details about the video. For instance, a video with John, age such-and-such, and other personal details are whom sent this video. However, when someone is viewing, this is very private information. The viewer only sees the video content, e.g., that it is a dance video The sensitive information is stripped.

In an embodiment, step 802 (request) may be executed by the viewer 410; step 824 (upload video) may be executed by creator 420; step 826 (process updated Ad library and generate Ad ID) may be executed by Ad server-database 408; and step 830 (display suitable Ads) may be executed by frontend server 406.

Figure 9:
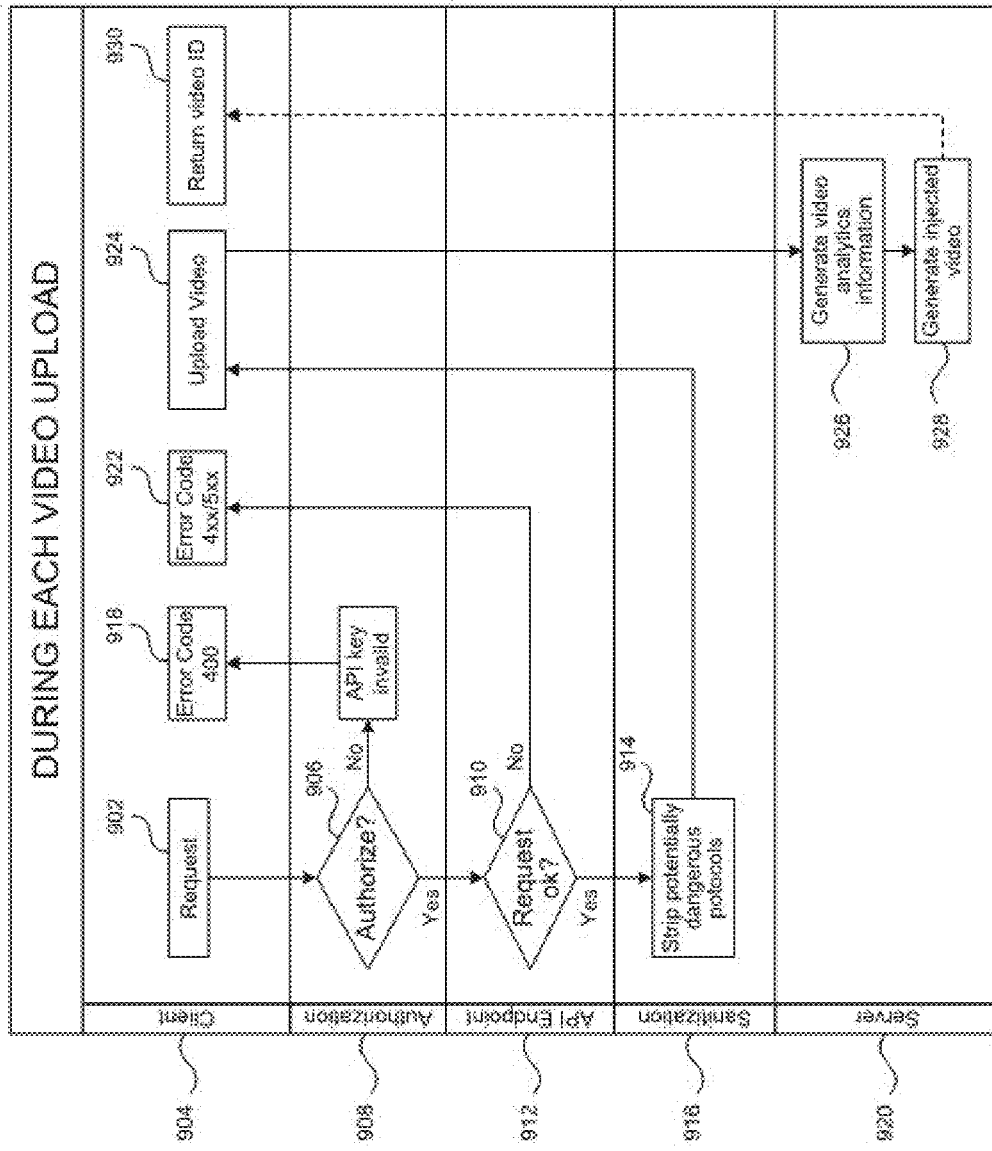
FIG. 9 depicts a network environment for during each video upload, in accordance with an embodiment.

An embodiment can be understood with reference to FIG. 9, a network environment for during each video upload. Similarly, as in FIG. 8, the server (e.g., frontend 406) receives a request 902 for a video from the client device 904. In response to the receipt, an authorization processor 908 determines whether the client is authorized to obtain or view the video. For example, the server checks whether it a private video or a public video. If it is a public video, then the server checks whether this client has access ability. If so, the process continues along the "yes" path. If not, the authorization process 908 may determine that the API key is invalid 906. In this case, an error code 918 is returned to or displayed for the client 904. If yes, control goes to an API Endpoint processor 912. Such API Endpoint processor 912 checks whether the request, itself, is acceptable 910. If no, then the appropriate error handling 922 is performed. If yes, the control goes to a sanitization processor 916. Such processor strips the request of potentially dangerous protocols at step 914. After doing so, at step 924, the video is uploaded at the client. At step 926, the server 920 generates video analytics information about the video. At step 928, using the video analytics information, the server 920 generates the injected video. At step 930, the server 920 returns the video ID to the client 904.

In an embodiment, step 902 (request) may be executed by the viewer 410; step 924 (upload video) may be executed by creator 420; and step 926 may be executed by the video analytics component 412.

Figure 10:
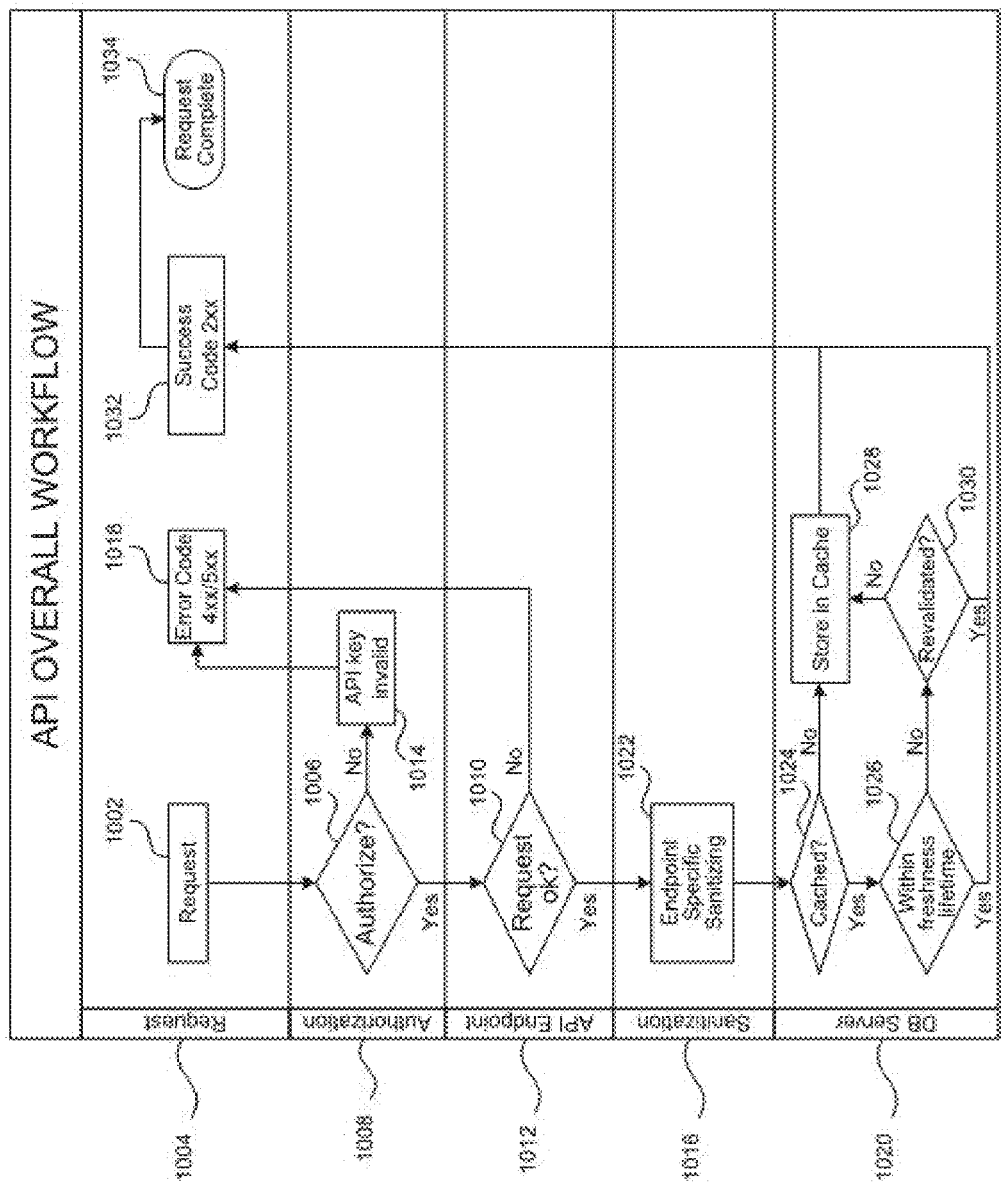
FIG. 10 depicts a network environment for API overall workflow, in accordance with an embodiment.

An embodiment can be understood with reference to FIG. 10, a network environment for API overall workflow. A request processor 1104 receives the request 1002. The authorization processor 1008 determines whether the request was authorized 1106. If not, it is found that the API is not valid 1014. An error handling code is activated 1018. If yes, the API Endpoint processor 1012 checks whether the request is acceptable 1010. If not, the error handling code is activated 1018. If yes, the sanitization processor 1016 performs endpoint specific sanitizing 1022, consistent with embodiments described above. Then the database server 1020 determines whether the request has been cached 1014. If not, the request is stored in cache 1028. If yes, the database server 1020 determines whether the date and time of the request is within a freshness lifetime threshold 1026. If not, the database server 1020 determines whether the request has been revalidated 1030. If not, the request is stored in cache 1028. If yes, the request is a success and a success code 1032 is associated with the request 1004. If the database server 1020 determines that, yes, the date and time of the request is within a freshness lifetime threshold 1026, then the request is a success and a success code 1032 is associated with the request 1004. At step 1034, the request is complete 1034.

In an embodiment, step 1002 (request) may be executed by the viewer 410; steps 1024 (cached?), 1026 (within freshness lifetime), 1028 (store in cache), and 1030 (revalidated?) may be executed by backend server 404; and step 1034 (request complete) may be executed by the frontend server 406.

In another exemplary aspect, a method for providing in-video product placement and in-video purchasing capability using augmented reality is disclosed. The method includes receiving a request for a video, the request initiated by a viewer; in response to receiving the request, retrieving, from a video database, a video analytics data file corresponding to the requested video, the video analytics data file comprising analytical data about the video; receiving a user-behavioral data file, the user-behavioral data file comprising information about the viewer's current viewing habits and viewing preferences; transmitting the video analytics data file and the user-behavioral data file to an ad matching component executed by a processor; comparing, by the ad matching component, the video analytics data file and the user-behavioral data file and determining one or more similar objects from each of the files that are considered to be matching; generating, by the ad matching component, a corresponding one or more scores for the one or more matching objects; transmitting, to an ad server component executed by a processor, a highest score corresponding to one of the matching objects and attributes of the one of the matching objects; receiving, from the ad server component, an ad file corresponding to the highest score and the attributes and the ad file comprising data of a product, wherein the product is associated with the highest score and the attributes; retrieving from the video database, the requested video file; delivering, to a frontend component executed by a processor, the video file corresponding to the requested video and the ad file, the delivery intended for a content-layering component for presentation to the viewer; and superimposing on or injecting into, by the content-layering component, the contents of the ad file to the video before displaying the video, wherein the superimposed or injected contents of the ad file comprise the product data and wherein the displayable product data are configured to be interactive for the viewer to purchase the product.

Additionally, the video analytics file was generated by a video analytics component executed by a processor, the video analytics component parsing the video file frame-by-frame and performing the operations of: identifying basic informational data about the video; identifying one or more content objects in the video; identifying a classification of each of the identified one or more content objects of the video; identifying a purchasable product for each of the identified one or more content objects of the video; logging the video file in a locally stored registry; generating the video analytics file; and storing the video analytics file for future retrievals.

Additionally, the video analytics file is a JSON formatted file.

Additionally, the video file was uploaded to the video database by the creator.

Additionally, the method further comprises: receiving, by the ad server component on an ongoing basis from one or more vendors, product description data corresponding to products that are offered by the one or more vendors; and storing, by the ad server component in local dictionary, the product description data about the product for future retrieval; wherein the product description data is sufficient for the vendor to identify the product for a purchase request.

Additionally, the product description data comprises: price of product; product identifier; and product attributes.

Additionally, the method comprises receiving, by a purchase product component executed by a processor and from an overlaid product-detail window from the video file as the video file is being streamed by the viewer, a request to purchase a product corresponding to the product in the overlaid product-detail window, wherein the request comprises required viewer informational data for purchasing the product.

Additionally, the required viewer informational data comprises three pieces of information: the delivery address for where the product is to be delivered; credit card information, debit card information, or other currency information for actuating the purchase of the product; and informational data about the product for identifying the product.

Additionally, the method comprises transmitting, by the purchase product component, the three pieces of information to the vendor, causing the completion of the purchase.

Additionally, the user-behavioral data file was generated by a user-behavioral component executed by a processor, the user-behavioral component performing operations as the viewer views each video of one or more videos, the operations comprising: determining what objects in the video the viewer likes best, based on rating-ranking-page optimization-content aware recommendations; generating and continually updating a user vector corresponding to the viewer; refining what objects in the video the viewer likes best, based on recommendations using the user vector; further refining what objects in the video the viewer likes best, based on other-user data, using content-based and collaborative behaviors of users and recommendation systems; and further refining what objects in the video the viewer likes best, based on data that is not required, using collaborative denoising auto-encoders for Top-N recommender systems.

Additionally, the following mathematical processes are employed: regression models, comprising: logistic, linear, and elastic nets; tree-based methods, comprising: gradient-boosted and random forests; matrix factorizations; factorizations machines; restricted Boltzmann machines; Markov chains and other graphical models; clustering, comprising: from k means to HDP; deep learning and neural nets; linear discriminant analysis; and association rules.

Additionally, the method further comprises generating, monitoring, and updating the following parameters on a continual basis: titles watched or abandoned in a recent past by the viewer; members with similar tests and/or user data; titles with similar attributes; propensity of the viewer to re-watch a video; preference for what the viewer is watching; ratings of the videos being watched by the viewer; time of day of viewing session by the viewer; voracity of video consumptions by the viewer; and use of list searches by the view.

An Example Machine Overview

FIG. 11 is a block schematic diagram of a system in the exemplary form of a computer system 1100 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1100 includes a processor 1102, a main memory 1104 and a static memory 1106, which communicate with each other via a bus 1108. The computer system 1100 may further include a display unit 1110, for example, a liquid crystal display (LCD) or a cathode ray tube (CRT). The computer system 1100 also includes an alphanumeric input device 1112, for example, a keyboard; a cursor control device 1114, for example, a mouse; a disk drive unit 1116, a signal generation device 1118, for example, a speaker, and a network interface device 1128.

The disk drive unit 1116 includes a machine-readable medium 1124 on which is stored a set of executable instructions, i.e. software, 1126 embodying any one, or all, of the methodologies described herein below. The software 1126 is also shown to reside, completely or at least partially, within the main memory 1104 and/or within the processor 1102. The software 1126 may further be transmitted or received over a network 1130 by means of a network interface device 1128.

In contrast to the system 1100 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to purchase a product within the video on such internet-enabled or other network-enabled devices, servers, or clients. It further should be appreciated that one or more cloud computing embodiments include purchasing within the video using mobile devices, tablets, and the like, as such devices are becoming standard consumer devices.

Although the invention is described herein in terms of several embodiments, one skilled in the art will readily appreciate that other applications may be substituted for those set forth herein without departing from the spirit and scope of the present invention. Accordingly, the invention should only be limited by the Claims included below.

The invention claimed is:

1. A method, comprising:
   receiving a request for a video, the request initiated by a viewer;
   in response to receiving the request, retrieving, from a video database, a video analytics data file corresponding to the requested video, the video analytics data file comprising analytical data about the video;
   receiving a user-behavioral data file, the user-behavioral data file comprising information about the viewer's current viewing habits and viewing preferences;
   transmitting the video analytics data file and the user-behavioral data file to an ad matching component executed by a processor;
   comparing, by the ad matching component, the video analytics data file and the user-behavioral data file and determining one or more similar objects from each of the files that are considered to be matching;
   generating, by the ad matching component, a corresponding one or more scores for the one or more matching objects;
   transmitting, to an ad server component executed by a processor, a highest score corresponding to one of the matching objects and attributes of the one of the matching objects;
   receiving, from the ad server component, an ad file corresponding to the highest score and the attributes and the ad file comprising data of a product, wherein the product is associated with the highest score and the attributes;
   retrieving from the video database, the requested video file;
   delivering, to a frontend component executed by a processor, the video file corresponding to the requested video and the ad file, the delivery intended for a content-layering component for presentation to the viewer; and
   superimposing on or injecting into, by the content-layering component, the contents of the ad file to the video before displaying the video, wherein the superimposed or injected contents of the ad file comprise the product data and wherein the displayable product data are configured to be interactive for the viewer to purchase the product.

2. The method of claim 1, wherein the video analytics file was generated by a video analytics component executed by a processor, the video analytics component parsing the video file frame-by-frame and performing the operations of:
   identifying basic informational data about the video;
   identifying one or more content objects in the video;
   identifying a classification of each of the identified one or more content objects of the video;
   identifying a purchasable product for each of the identified one or more content objects of the video;
   logging the video file in a locally stored registry;
   generating the video analytics file; and
   storing the video analytics file for future retrievals.

3. The method of claim 2, wherein the video analytics file is a JSON formatted file.

4. The method of claim 1, wherein the video file was uploaded to the video database by the creator.

5. The method of claim 1, further comprising:
   receiving, by the ad server component on an ongoing basis from one or more vendors, product description data corresponding to products that are offered by the one or more vendors; and
   storing, by the ad server component in local dictionary, the product description data about the product for future retrieval;
   wherein the product description data is sufficient for the vendor to identify the product for a purchase request.

6. The method of claim 5, wherein the product description data comprises: price of product; product identifier; and product attributes.

7. The method of claim 1, further comprising:
   receiving, by a purchase product component executed by a processor and from an overlaid product-detail window from the video file as the video file is being streamed by the viewer, a request to purchase a product corresponding to the product in the overlaid product-detail window, wherein the request comprises required viewer informational data for purchasing the product.

8. The method of claim 7, wherein the required viewer informational data comprises three pieces of information: the delivery address for where the product is to be delivered; credit card information, debit card information, or other currency information for actuating the purchase of the product; and informational data about the product for identifying the product.

9. The method of claim 7, further comprising:
transmitting, by the purchase product component, the three pieces of information to the vendor, causing the completion of the purchase.

10. The method of claim 1, wherein the user-behavioral data file was generated by a user-behavioral component executed by a processor, the user-behavioral component performing operations as the viewer views each video of one or more videos, the operations comprising:
determining what objects in the video the viewer likes best, based on rating-ranking-page optimization-content aware recommendations;
generating and continually updating a user vector corresponding to the viewer;
refining what objects in the video the viewer likes best, based on recommendations using the user vector;
further refining what objects in the video the viewer likes best, based on other-user data, using content-based and collaborative behaviors of users and recommendation systems; and
further refining what objects in the video the viewer likes best, based on data that is not required, using collaborative denoising auto-encoders for Top-N recommender systems.

11. The method of claim 10, wherein the following mathematical processes are employed:
regression models, comprising: logistic, linear, and elastic nets;
tree-based methods, comprising: gradient-boosted and random forests;
matrix factorizations;
factorizations machines;
restricted Boltzmann machines;
Markov chains and other graphical models;
clustering, comprising: from k means to HDP;
deep learning and neural nets;
linear discriminant analysis; and
association rules.

12. The method of claim 10, further comprising generating, monitoring, and updating the following parameters on a continual basis:
titles watched or abandoned in a recent past by the viewer;
members with similar tests and/or user data;
titles with similar attributes;
propensity of the viewer to re-watch a video;
preference for what the viewer is watching;
ratings of the videos being watched by the viewer;
time of day of viewing session by the viewer;
voracity of video consumptions by the viewer; and
use of list searches by the view.

13. A network-accessible platform, comprising:
a receiving processor for receiving a request for a video, the request initiated by a viewer;
a retrieving processor for retrieving, from a video database and for in response to receiving the request, a video analytics data file corresponding to the requested video, the video analytics data file comprising analytical data about the video;
a receiving processor for receiving a user-behavioral data file, the user-behavioral data file comprising information about the viewer's current viewing habits and viewing preferences;
a transmitting processor for transmitting the video analytics data file and the user-behavioral data file to an ad matching component executed by a processor;
a comparing processor comparing, by the ad matching component, the video analytics data file and the user-behavioral data file and determining one or more similar objects from each of the files that are considered to be matching;
a generating processor for generating, by the ad matching component, a corresponding one or more scores for the one or more matching objects;
a transmitting processor for transmitting, to an ad server component executed by a processor, a highest score corresponding to one of the matching objects and attributes of the one of the matching objects;
a receiving processor for receiving, from the ad server component, an ad file corresponding to the highest score and the attributes and the ad file comprising data of a product, wherein the product is associated with the highest score and the attributes;
a retrieving processor for retrieving from the video database, the requested video file; and
a delivering processor for delivering, to a frontend component executed by a processor, the video file corresponding to the requested video and the ad file, the delivery intended for a content-layering component for presentation to the viewer; and
a superimposing on or injecting processor for superimposing on or injecting into, by the content-layering component, the contents of the ad file to the video before displaying the video, wherein the superimposed or injected contents of the ad file comprise the product data and wherein the displayable product data are configured to be interactive for the viewer to purchase the product.

14. The network-accessible platform of claim 13, further comprising:
a parsing processor for parsing the video file frame-by-frame and performing the operations of:
identifying basic informational data about the video;
identifying one or more content objects in the video;
identifying a classification of each of the identified one or more content objects of the video;
identifying a purchasable product for each of the identified one or more content objects of the video;
logging the video file in a locally stored registry;
generating the video analytics file; and
storing the video analytics file for future retrievals.

15. The network-accessible platform of claim 13, further comprising:
a receiving processor for receiving, by the ad server component on an ongoing basis from one or more vendors, product description data corresponding to products that are offered by the one or more vendors; and
a storing processor for storing, by the ad server component in local dictionary, the product description data about the product for future retrieval;
wherein the product description data is sufficient for the vendor to identify the product for a purchase request.

16. The network-accessible platform of claim 13, further comprising:
a determining processor for determining what objects in the video the viewer likes best, based on rating-ranking-page optimization-content aware recommendations;

a generating and updating user vector processor for generating and continually updating a user vector corresponding to the viewer;

a first refining processor for refining what objects in the video the viewer likes best, based on recommendations using the user vector;

a second refining processor for further refining what objects in the video the viewer likes best, based on other-user data, using content-based and collaborative behaviors of users and recommendation systems; and a third refining processor for further refining what objects in the video the viewer likes best, based on data that is not required, using collaborative denoising auto-encoders for Top-N recommender systems.

17. A non-transitory computer readable medium having stored thereon instructions which, when executed by a processor, performs the steps of:

receiving a request for a video, the request initiated by a viewer;

in response to receiving the request, retrieving, from a video database, a video analytics data file corresponding to the requested video, the video analytics data file comprising analytical data about the video;

receiving a user-behavioral data file, the user-behavioral data file comprising information about the viewer's current viewing habits and viewing preferences;

transmitting the video analytics data file and the user-behavioral data file to an ad matching component executed by a processor;

comparing, by the ad matching component, the video analytics data file and the user-behavioral data file and determining one or more similar objects from each of the files that are considered to be matching;

generating, by the ad matching component, a corresponding one or more scores for the one or more matching objects;

transmitting, to an ad server component executed by a processor, a highest score corresponding to one of the matching objects and attributes of the one of the matching objects;

receiving, from the ad server component, an ad file corresponding to the highest score and the attributes and the ad file comprising data of a product, wherein the product is associated with the highest score and the attributes;

retrieving from the video database, the requested video file;

delivering, to a frontend component executed by a processor, the video file corresponding to the requested video and the ad file, the delivery intended for a content-layering component for presentation to the viewer; and superimposing on or injecting into, by the content-layering component, the contents of the ad file to the video before displaying the video, wherein the superimposed or injected contents of the ad file comprise the product data and wherein the displayable product data are configured to be interactive for the viewer to purchase the product.

18. The non-transitory computer readable medium of claim 17, wherein the instructions further cause the processor to:

parse the video file frame-by-frame and perform the operations of:
identify basic informational data about the video;
identify one or more content objects in the video;
identify a classification of each of the identified one or more content objects of the video;
identify a purchasable product for each of the identified one or more content objects of the video;
log the video file in a locally stored registry;
generate the video analytics file; and
store the video analytics file for future retrievals.

19. The non-transitory computer readable medium of claim 17, wherein the instructions further cause the processor to:

receive, by the ad server component on an ongoing basis from one or more vendors, product description data corresponding to products that are offered by the one or more vendors; and store, by the ad server component in local dictionary, the product description data about the product for future retrieval;

wherein the product description data is sufficient for the vendor to identify the product for a purchase request.

20. The non-transitory computer readable medium of claim 17, wherein the instructions further cause the processor to:

determine what objects in the video the viewer likes best, based on rating-ranking-page optimization-content aware recommendations;

generate and continually update a user vector corresponding to the viewer;

refine what objects in the video the viewer likes best, based on recommendations using the user vector;

further refine what objects in the video the viewer likes best, based on other-user data, using content-based and collaborative behaviors of users and recommendation systems; and further refine what objects in the video the viewer likes best, based on data that is not required, using collaborative denoising auto-encoders for Top-N recommender systems.

* * * * *